United States Patent
Line et al.

(10) Patent No.: US 10,940,776 B2
(45) Date of Patent: Mar. 9, 2021

(54) ADJUSTABLE SEAT

(71) Applicant: Ford Global Technologies, LLC, Dearborn, MI (US)

(72) Inventors: Johnathan Andrew Line, Northville, MI (US); Carol Diane Casey, Dearborn, MI (US); S. M. Akbar Berry, Windsor (CA); Andrew Matusko, Dexter, MI (US); Marcos Silva Kondrad, Macomb Township, MI (US); Spencer Robert Hoernke, Dunda (CA); Rodney Charles Brinker, Eastpointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/386,760

(22) Filed: Apr. 17, 2019

(65) Prior Publication Data
US 2020/0331366 A1 Oct. 22, 2020

(51) Int. Cl.
*B60N 2/16* (2006.01)

(52) U.S. Cl.
CPC ........... *B60N 2/1615* (2013.01); *B60N 2/165* (2013.01); *B60N 2/1695* (2013.01)

(58) Field of Classification Search
CPC .... B60N 2/1615; B60N 2/165; B60N 2/1695; B60N 2/1605; B60N 2/18
See application file for complete search history.

(56) References Cited

U.S. PATENT DOCUMENTS

| | | |
|---|---|---|
| 2,736,566 A | 2/1956 | Hartl |
| 3,357,736 A | 12/1967 | McCarthy |
| 4,181,354 A | 1/1980 | Grass et al. |
| 4,509,796 A | 4/1985 | Takagi |
| 5,154,402 A | 10/1992 | Hill et al. |
| 5,340,185 A | 8/1994 | Vollmer |
| 5,358,305 A | 10/1994 | Kaneko et al. |
| 5,460,427 A | 10/1995 | Serber |
| 5,556,160 A | 9/1996 | Mikami |
| 5,558,399 A | 9/1996 | Serber |
| 5,695,242 A | 12/1997 | Brantman et al. |
| 5,908,219 A | 6/1999 | Bohmler |
| 6,053,575 A | 4/2000 | Bauer et al. |
| 6,264,275 B1 * | 7/2001 | Frohnhaus ........... B60N 2/1615 297/344.12 |
| 6,386,631 B1 | 5/2002 | Masuda et al. |
| 6,428,102 B1 | 8/2002 | Becker et al. |
| 7,281,749 B2 | 10/2007 | Yamada et al. |
| 7,631,939 B2 | 12/2009 | Wulf et al. |
| 8,240,766 B2 | 8/2012 | Gilbert et al. |

(Continued)

FOREIGN PATENT DOCUMENTS

EP 0526842 B1 4/1997

*Primary Examiner* — Syed A Islam
(74) *Attorney, Agent, or Firm* — David Coppiellie; Price Henveld LLP (57) ABSTRACT

A vehicle seating assembly includes a seat and a linkage assembly disposed between the seat and a base member that is positionable between a rest position and a deployed position. In the rest position, a first angle is formed between a seat pan assembly and a bottom of the base member. In the deployed position, a second angle is formed between the seat pan assembly and the bottom of the base member. The second angle is greater than the first angle.

17 Claims, 10 Drawing Sheets

(56) References Cited

U.S. PATENT DOCUMENTS

| | | |
|---|---|---|
| 8,272,687 B2 | 9/2012 | Gross et al. |
| 8,616,645 B2 | 12/2013 | Ito |
| 8,888,181 B2 | 11/2014 | Perraut et al. |
| 9,399,415 B2 | 7/2016 | Serber |
| 9,586,506 B2 | 3/2017 | Line et al. |
| 9,981,569 B2 | 5/2018 | Frasher |
| 10,562,416 B2 * | 2/2020 | Kajino ................. B60N 2/1615 |
| 10,569,670 B2 * | 2/2020 | Mizukoshi ............. B60N 2/165 |
| 10,640,016 B2 * | 5/2020 | Bonk ....................... B60N 2/12 |
| 2004/0075322 A1 | 4/2004 | Jaeger et al. |
| 2013/0278031 A1 | 10/2013 | Kostin et al. |
| 2019/0061568 A1 * | 2/2019 | Hirata .................... B60N 2/045 |
| 2019/0291608 A1 * | 9/2019 | Kong .................. B60N 2/1615 |

* cited by examiner

ADJUSTABLE SEAT

FIELD OF THE DISCLOSURE

The present disclosure generally relates to a vehicle seating assembly. More specifically, the present disclosure relates to a vehicle seating assembly that includes a mechanism for adjusting a seat position.

BACKGROUND OF THE DISCLOSURE

Mechanisms for adjusting seat positions may increase passenger comfort. It may be beneficial to have a mechanism for adjusting a seat position that may be efficiently incorporated into a vehicle. A passenger may move a seat from a first position to a second position to alleviate pressure exerted on a particular passenger body part.

SUMMARY OF THE DISCLOSURE

According to a first aspect of the present disclosure, a vehicle seating assembly includes a seat and a linkage assembly disposed between the seat and a base member that is positionable between a rest position and a deployed position. In the rest position, a first angle is formed between a seat pan assembly and a bottom of the base member. In the deployed position, a second angle is formed between the seat pan assembly and the bottom of the base member. The second angle is greater than the first angle.

Embodiments of the first aspect of the present disclosure can include any one or a combination of the following features:
- the linkage assembly includes a pair of primary linkage arms disposed below a primary portion of the seat pan assembly and a pair of secondary linkage arms disposed below a secondary portion of the seat pan assembly;
- the primary linkage arms are part of a first bracket disposed below a primary portion of the seat pan assembly;
- the secondary linkage arms are part of a second bracket disposed below a secondary portion of the seat pan assembly;
- the primary portion of the seat pan assembly includes a front portion of the seat pan assembly;
- the secondary portion of the seat pan assembly includes a rear portion of the seat pan assembly;
- the seat pan assembly includes first and second lateral seat pan members wherein each of the first and second lateral seat pan members are pivotably coupled to the first and second brackets;
- the first bracket is pivotally coupled to the base member, and the first bracket rotates about a first axis that extends through the base member between a rest position and a deployed position;
- the second bracket is pivotally coupled to the base member, and the second bracket rotates about a second axis that extends through the base member between a rest position and a deployed position;
- an actuator for engaging the second bracket, wherein the actuator exerts a force on the second bracket about the second axis to move the linkage assembly between the rest position and the deployed position;
- the actuator includes a rotary mechanism for rotating the second bracket about the second axis to move the linkage assembly between the rest position and the deployed position;
- a toothed interface between the rotary mechanism and the second bracket; and
- the toothed interface includes a plurality of teeth disposed on the second bracket and a plurality of teeth disposed on a wheel coupled to the rotary mechanism and wherein the rotary mechanism is selectively activable to position the linkage assembly in a plurality of intermittent positions that correspond to the plurality of teeth disposed on the second bracket.

According to a second aspect of the present disclosure, a vehicle seating assembly includes a seat with a seat bottom. First and second brackets are each pivotably coupled to the seat bottom and a base member. A rotary mechanism is coupled to the second bracket and the base member. The rotary mechanism is activable to move the seat bottom from a rest position to a deployed position. The rotary mechanism is activable to position the seat bottom in a plurality of intermittent positions between the rest position and the deployed position. In the rest position, a front portion of the seat bottom has a first height. In the deployed position, a front portion of a seat bottom has a second height that is greater than the first height.

Embodiments of the second aspect of the present disclosure can include any one or a combination of the following features:
- a toothed flange coupled to at least one of the first and second brackets;
- a toothed wheel coupled to the rotary mechanism, wherein the toothed flange and the toothed wheel form a toothed interface, and wherein the rotary mechanism rotates the toothed wheel to cause the toothed flange to move the seat bottom from the rest position to the deployed position and to selectively position the toothed flange in a plurality of intermittent positions between the rest position and the deployed position;
- a stop bracket secured to the rotary mechanism;
- a stop bolt extending from the stop bracket and through a cut-away portion of the toothed flange, wherein the stop bolt extends through the cut-away portion of the toothed flange as the toothed flange rotates to move the seat bottom between the rest position and the deployed position;
- in the rest position, the stop bolt is disposed in a first end of the cut-away portion of the flange and wherein, in the deployed position, the stop bolt is disposed in a second end of the cut-away portion of the flange;
- the toothed flange and the second bracket are integral parts; and
- the seat bottom includes a seat pan assembly pivotably coupled to the first bracket and the second bracket.

According to a third aspect of the present disclosure, a vehicle seating assembly includes a seat pan assembly with four linkage arms pivotably coupled with the seat pan assembly. A base member is pivotably coupled with each of the four linkage arms. A gear rack is coupled with one of the four linkage arms and defines an articulation path therefor. A pinion operably engages the gear rack to drive articulation of one of the four linkage arms and movement of the seat pan assembly between a rest position and a deployed position.

These and other aspects, objects, and features of the present disclosure will be understood and appreciated by those skilled in the art upon studying the following specification, claims, and appended drawings.

DETAILED DESCRIPTION

Figure 1:
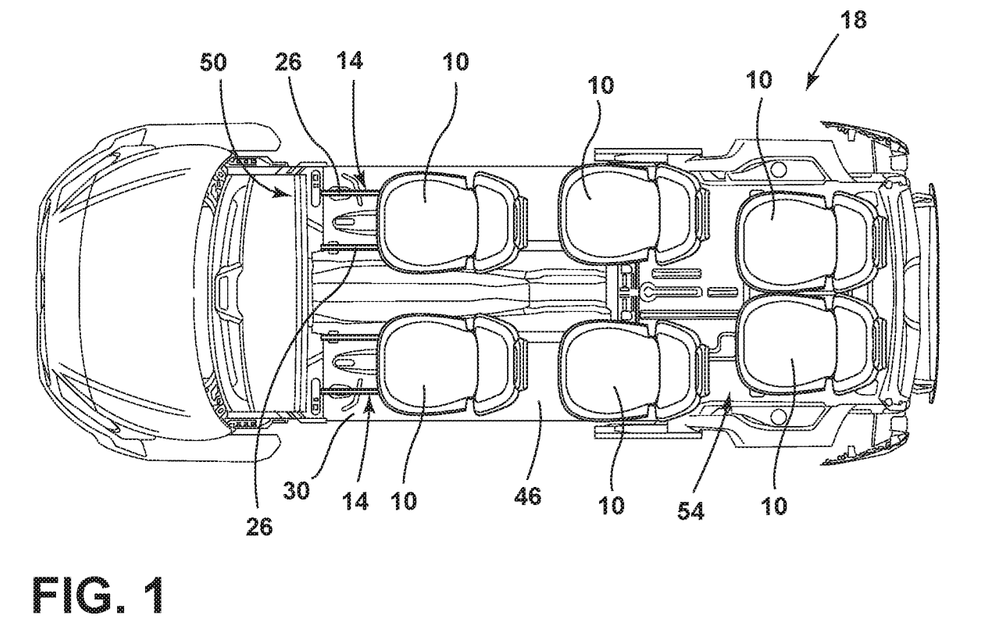
FIG. 1 is a top plan view of a portion of a vehicle having a plurality of vehicle seating assemblies in a first configuration.

For purposes of description herein, the terms "upper," "lower," "right," "left," "rear," "front," "vertical," "horizontal," "interior," "exterior," and derivatives thereof shall relate to the vehicle 18 as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the vehicle seating assembly 10 described below and shown in the attached figures, a vehicle seating assembly 10 may be described from the vantage point of a passenger 124 seated in the seating assembly 10. The side of a seating assembly 10 disposed on a right side of a seated passenger 124 may be referred to as a right side or a first side of the seating assembly 10. The side of a seating assembly 10 disposed on a left side of a seated passenger 124 may be referred to as a left side or a second side of the seating assembly 10.

Figure 2:
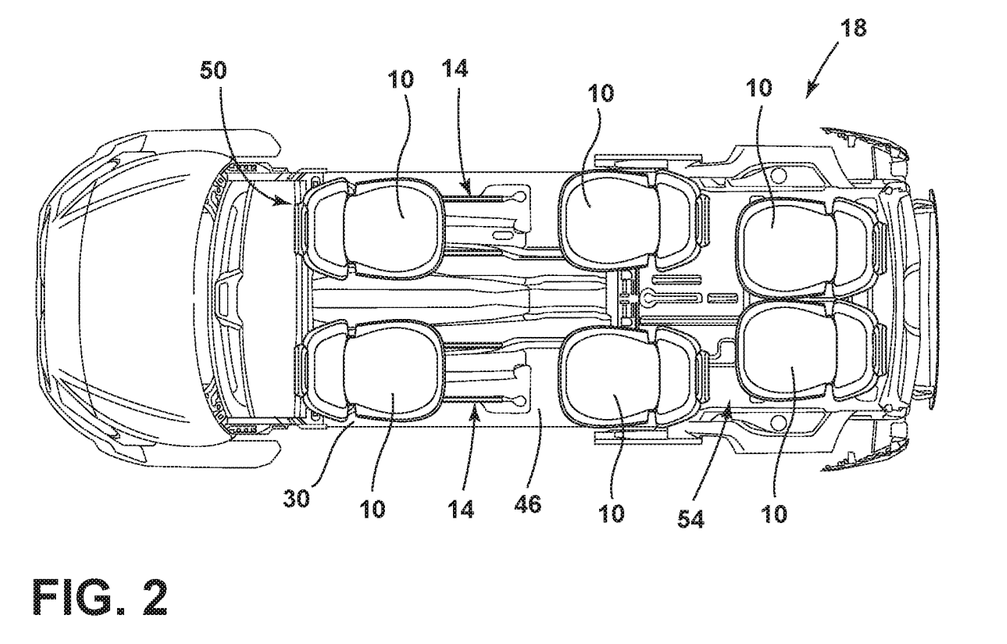
FIG. 2 is a top plan view of a portion of a vehicle having a plurality of vehicle seating assemblies in a second configuration.
Figure 3:
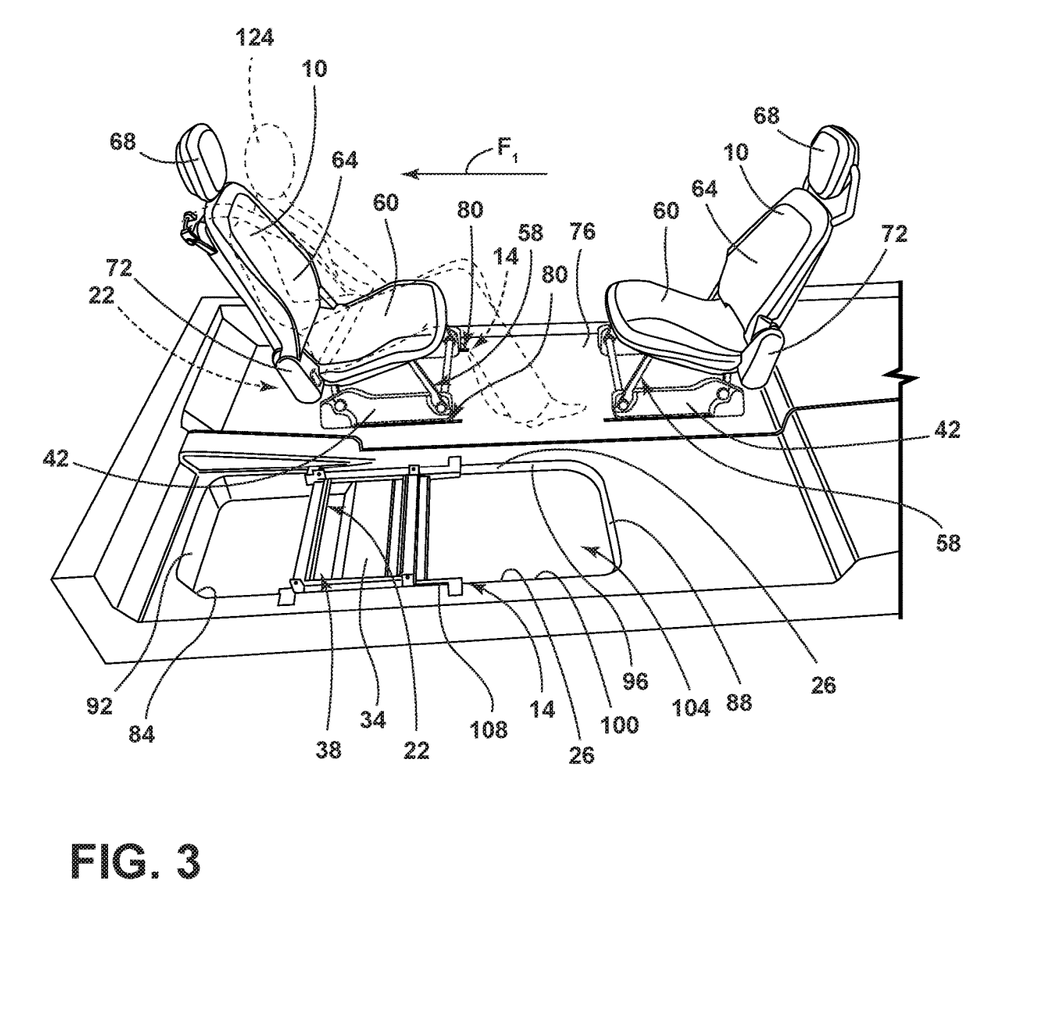
FIG. 3 is a side perspective view of a floor of a vehicle including a plurality of vehicle seating assemblies and a track assembly.

Referring to FIGS. 1-3, a vehicle seating assembly 10 may include various features for providing movability of the vehicle seating assembly 10. The vehicle seating assembly 10 may include a track assembly 14 for translating the vehicle seating assembly 10 fore and aft within the vehicle 18. The track assembly 14 may be a long track assembly 14 or a short track assembly 14 for full or partial movement of the seating assembly 10 within the vehicle 18, respectively. The seating assembly 10 may further include a platform 22 extending between tracks 26 of the track assembly 14. The platform 22 and the track assembly 14 may be integrated into the vehicle underbody frame 30 to provide structural stiffness and side-impact performance. The platform 22 includes cross-members configured to allow the structural stiffness needed for side-impact performance to move with the seating assembly 10, allowing the seating assembly 10 to be moved into various positions while maintaining structural support. Further, the platform 22 may also include a universal attachment system 38 to allow various seating assemblies to couple with the platform 22 including, for example, rotating seating assemblies. Also, a seating assembly 10 may have a base member 42 that may be a module that may be received by the universal attachment system 38 of the platform 22. The platform 22 may include extendable, or widening, cross-members that may be adjustable to configure the platform 22 to receive base members 42 of various widths that may correspond to seating assemblies 10 of various widths.

Referring now to FIGS. 1 and 2, a vehicle underbody frame 30 is shown having a plurality of seating assemblies 10. The vehicle underbody frame 30 may include a floor panel 46 configured to support the plurality of seating assemblies 10. The vehicle underbody frame 30 may further include a front area 50 and a rear area 54. One or more of the plurality of seating assemblies 10 may be configured as the movable vehicle seating assembly 10. It is contemplated that the vehicle 18 may be any type of vehicle, for example a car, a truck, a van, or other vehicle. It is also contemplated that the vehicle 18 may be an autonomous vehicle. It is also contemplated that the concept set forth in this disclosure may be utilized in the front area 50 of the vehicle 18 as well as the rear area 54 of the vehicle 18, depending on the configuration of the vehicle 18.

A portion of the plurality of seating assemblies 10 of FIGS. 1 and 2 is shown positioned within the front area 50 of the vehicle 18 with one or more of the plurality of seating assemblies 10 being configured as a movable vehicle seating assembly 10. Another portion of the plurality of seating assemblies 10 may be positioned elsewhere within the vehicle 18. The plurality of seating assemblies 10 are operably coupled to the floor panel 46 of the vehicle 18 by track assemblies 34. Any one of the plurality of seating assemblies 10 may be configured as a movable vehicle seating assembly 10. The vehicle seating assemblies 10 may be translatable along the respective track assembly 14 between a first position (FIG. 1) and a second position (FIG. 2). Additionally, the vehicle seating assemblies 10 may be rotatable relative to the platform 22 using a swivel assembly (not shown). Where the vehicle seating assemblies 10 are rotatable, the vehicle seating assemblies may further be movable between a forward facing position (FIG. 1) and a rearward facing position (FIG. 2).

Referring now to FIG. 3, the seating assembly 10 includes a seat 60 and a seatback 64. The seat 60 may be disposed above the base member 42. A linkage assembly 58 for securing the seat 60 to the base member 42 may be disposed between the seat 60 and the base member 42. The seatback 64 may be pivotally coupled to the seat 60. A headrest 68 may be coupled to the seatback 64. As previously explained, according to various examples, the seating assembly 10 may include covers 72 positioned on either side of the seating assembly 10.

A floor cover 76 may be positioned above and parallel to the floor panel 46 and may be configured to conceal the track assembly 34. The floor cover 76 may define a plurality of slots 80. The plurality of slots 80 may be defined over the tracks 26 of the track assembly 34, such that the platform 22 may extend at least partially through the plurality of slots 80 to couple to the track assembly 34. Each of the slots 80 may be defined to have a length selected to allow movement of the seating assembly 10 between the first position (FIG. 1) and the second position b (FIG. 2).

The floor cover 76 may further conceal a cutout 84 of the floor panel 46. The cutout 84 may be configured to house the track assembly 34. The cutout 84 may include front and rear walls 88, 92 and sidewalls 96, 100. The sidewalls 96, 100 may be spaced apart and may frame a void 104 of the cutout 84. The track assembly 34 may be positioned within the void 104. In various examples, the platform 22 may at least partially be positioned within the void 104 and the track assembly 34. The track assembly 34 may include guides 108 positioned on first and second sides of the seating assembly 10 and operably coupled with the cutout 84. The guides 108 may be positioned in pairs. Each guide 108 may be operably coupled with one of the sidewalls 96, 100, such that the track assembly 34 is recessed within the cutout 84, as the seating assembly 10 is translated between the first position (FIG. 1) and the second position (FIG. 2).

Referring to FIGS. 1-12, a vehicle seating assembly 10 may include a seat 60 and a linkage assembly 58 disposed between a seat 60 and a base member 42. The linkage assembly 58 may be positionable between a rest position A and a deployed position B. In the rest position A, a first angle cu is formed between the seat pan assembly 142 and a bottom 44 of the base member 42. In the deployed position, a second angle $\alpha_2$ is formed between the seat pan assembly 142 and a bottom 44 of the base member 42. The second angle $\alpha_2$ is greater than the first angle $\alpha_1$.

It is desirable to increase passenger 124 comfort during travel. While seated in a conventional seating position (for example rest position A) during travel in a vehicle 18, the thigh and gluteal muscles of a passenger 124 might experience uncomfortable pressure. The comfort of the seated passenger 124 may be increased by moving the seat 60 to a deployed position B. In the deployed position B, the portion of the seat 60 disposed proximate the knees of the passenger 124 may be raised, and the portion of the seat 60 disposed proximate the gluteal muscles of the passenger 124 may be lowered. As the seat 60 moves from the rest position A to the deployed position B, pressure may shift from the thigh and gluteal muscles of a passenger 124 to the hips of the passenger 124. Thus, the deployed position B may allow the passenger 124 to assume a more comfortable posture than the rest position A. As such, the exertion of pressure on the hips of the passenger 124 (instead of on the thigh and gluteal muscles of the passenger 124) may increase the comfort of the passenger 124 during vehicle 18 travel.

Figure 4:
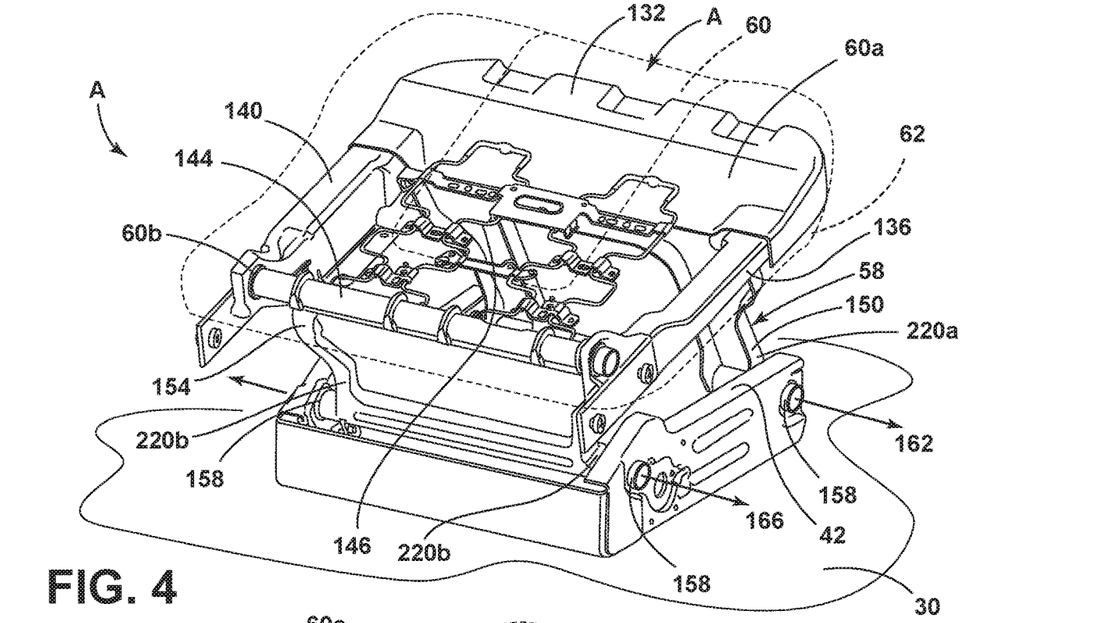
FIG. 4 is back perspective view of a first side of a seat including a seat pan, a linkage assembly, and a base member, according to an example.
Figure 5:
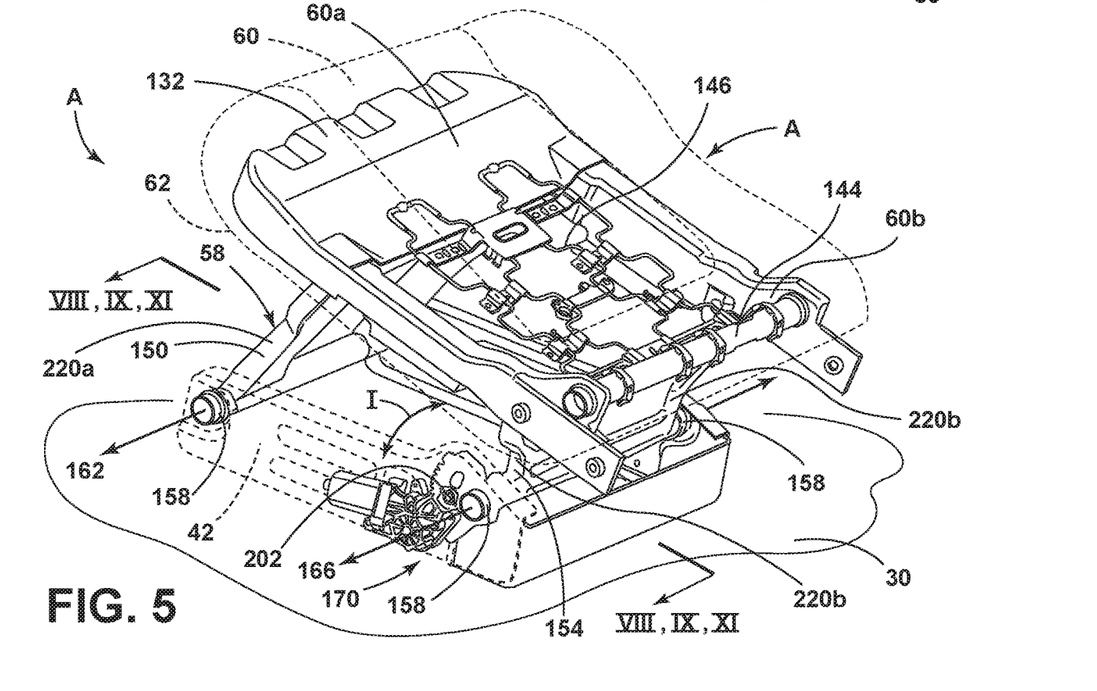
FIG. 5 is a back perspective view of a second side of the seat shown in FIG. 4 including a seat pan, a linkage assembly, and a base member, according to an example.
Figure 6:
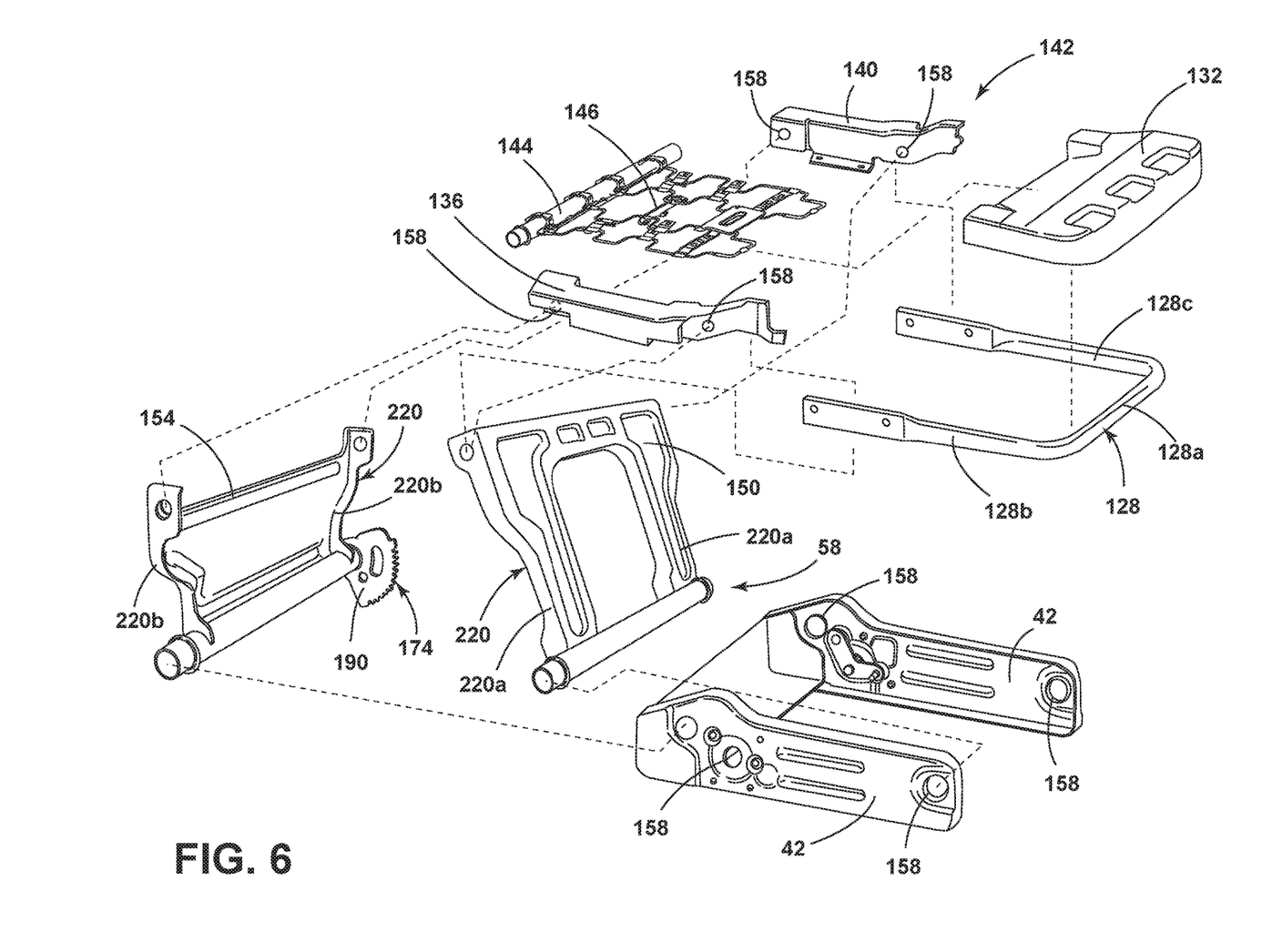
FIG. 6 is an exploded assembly view of the seat, according to an example.

Referring to FIGS. 4-5, the seat 60, the linkage assembly 58, and a base member 42 are shown in a right side rear perspective view (FIG. 4) and a left side rear perspective view (FIG. 5). FIGS. 4 and 5 show the seat 60 in the rest position A. FIG. 6 shows an exploded assembly view of the seat 60, the linkage assembly 58, and a base member 42. The seat 60 may include at least a u-shaped support member 128, a seat pan assembly 142, and a suspension 146. The term seat pan assembly 142 may include the center seat pan member 132, the first lateral seat pan member 136, and the second lateral seat pan member 140. The u-shaped support member 128 may include a central segment 128a, a first segment 128b, and a second segment 128c. The center seat pan member 132 may be disposed over the central segment 128a and portions of the first and second segments 128b, 128c of the u-shaped support member 128. The first lateral seat pan member 136 may be disposed over the first segment 128b of the u-shaped member 128. The second lateral seat pan member 140 may be disposed over the second segment 128c of the u-shaped member 128. A cross-bar 144 may extend between the first lateral seat pan member 136 and the second lateral seat pan member 140. A suspension 146 may extend between the seat pan assembly 142 and the cross-bar 144. The seat 60 may include a seat bottom 62. The seat bottom 62 may include the portion of the seat 60 that may be disposed below the suspension 146.

Referring again to FIGS. 4-5, a base member 42 may be configured to receive the linkage assembly 58 and may be adaptable to the previously described track assembly 14. The base member 42 may be disposed between the linkage assembly 58 and the vehicle underbody frame 30. The base member 42 may be slidably coupled to the tracks 26 of the track assembly 14.

With continued reference to FIGS. 4-5, the linkage assembly 58 for moving the seat 60 between a rest position A and a deployed position B may be disposed between the seat 60 and the base member 42. The linkage assembly 58 may include a first bracket 150 and a second bracket 154. The first bracket 150 may be pivotably coupled to the front portion 60a of the seat 60. The second bracket 154 may be pivotably coupled to a rear portion 60b of the seat 60. The first bracket 150 and the second bracket 154 may be pivotably coupled to the respective first and second lateral seat pan members 136, 140 of the seat pan assembly 142 (see, FIG. 6). It is also contemplated that the first and second brackets 150, 154 may be coupled to other parts of the seat 60 (for example, seat frame members or brackets coupled to the seat frame). The first bracket 150 may be pivotably coupled to the base member 42. A first axis 162 may extend through the pivot points 158 in the base member 42. The second bracket 154 may be pivotably coupled to the base member 42. A second axis 166 may extend through the pivot points 158 in the base member 42.

Figure 7:
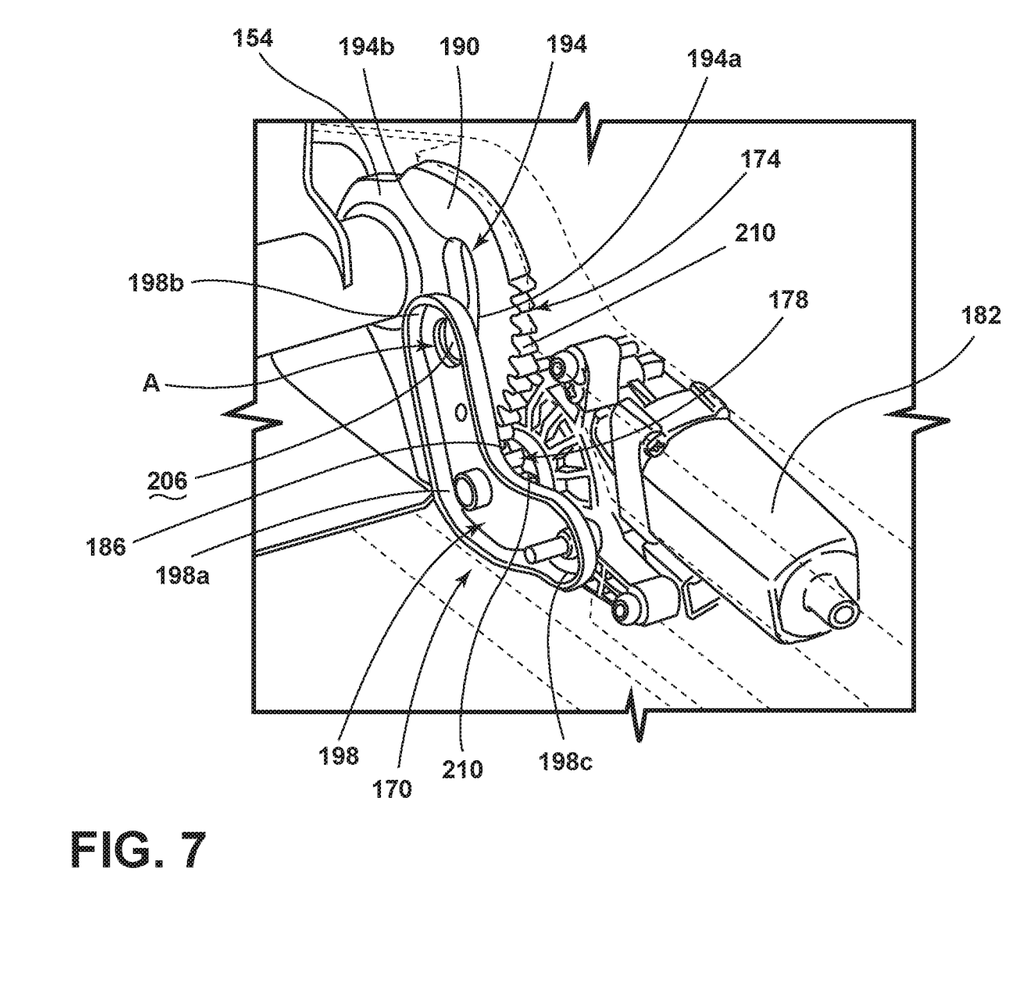
FIG. 7 is a perspective view of a rotation assembly disposed in an interior portion of the second side of a seat, according to an example.

With reference to FIGS. 5 and 7, a rotation assembly 170 may be located at the left side of the base member 42 and the left side of the second bracket 154. The rotation assembly 170 may be described as a rack-and-pinion assembly. The rotation assembly 170 may include a toothed portion 174 (rack) of the second bracket 154 and a toothed wheel 178 (pinion) coupled to actuator 182. The toothed portion 174 of the second bracket 154 and the toothed wheel 178 may form a toothed interface 186. Actuation of the actuator 182 may cause the toothed wheel 178 to rotate so that the toothed portion 174 of the second bracket 154 may move in the directions shown by arrow I (FIG. 5) between a rest position A and a deployed position B. The second bracket 154 may be positioned in a plurality of intermediary deployed positions (for example, $A_1$, $A_2$, $A_3$) between the rest position A and the deployed position B corresponding to the plurality of teeth 210 disposed on the second bracket 154.

With continued reference to FIGS. 5 and 7, the toothed portion 174 of the second bracket 154 may be disposed on a flange 190 that extends from the second bracket 154. The flange 190 may include a cut-away portion 194. The cut-away portion 194 may be an elongated curved portion. A stop bracket 198 may include a central portion 198a, a first extension 198b, and a second extension 198c. The first extension 198b may be positioned proximate the cut-away portion 194 of the flange 190. The second extension 198c may be positioned proximate the actuator 182. A stop bolt 202 may extend from the stop bracket 198 and into the cut-away portion 194 of the flange 190. The stop bolt 202 (FIG. 5) may extend through the aperture 206 of the stop bracket 198. The toothed wheel 178 may include teeth 210 that may drive the teeth 210 that are disposed on the flange 190 of the second bracket 154.

With continued reference to FIGS. 4-6, the linkage assembly 58 may be described as having four linkage arms 220. The four linkage arms may include a pair of primary linkage arms 220a and a pair of secondary linkage arms 220b. A primary linkage arm 220a may be disposed on the first side of the front portion 60a of the seat 60. A primary linkage arm 220a may be disposed on the second side of the front portion 60a of the seat 60. A secondary linkage arm 220b may be disposed on the first side of the rear portion 60b of the seat 60. A secondary linkage arm 220b may be disposed on the second side of the rear portion 60b of the seat 60.

Figure 8:
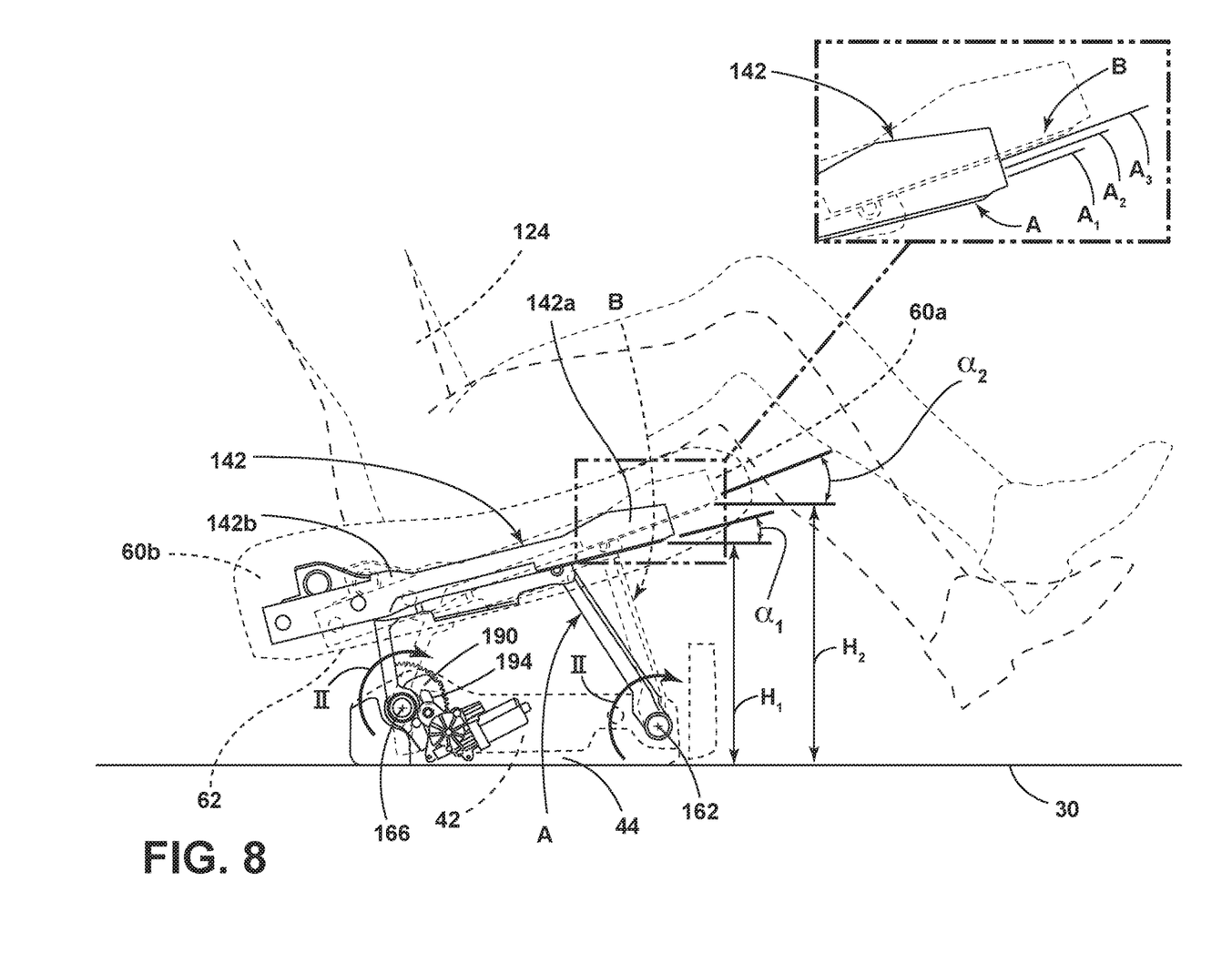
FIG. 8 is a side cross-sectional view taken along line VIII-VIII of FIG. 5 of a second side of a seat including a seat pan, a linkage assembly, and a base member in a rest position and a deployed position, according to an example.

Referring now to FIG. 8, a cross-sectional view is shown of the second or left interior side of the seat 60 shown in FIG. 5. The seat 60 is shown in the rest position A and the deployed position B. The seat bottom 62 may be angled at a first angle $\alpha_1$ relative to a substantially horizontal line disposed along a bottom 44 of the base member 42. The seat bottom 62 may be angled at a second angle $\alpha_2$ relative to a substantially horizontal line disposed along a bottom 44 of the base member 42. The first bracket 150 may rotate about a first axis 162 that may extend through the base member 42. A second bracket 154 may rotate about a second axis 166 that may extend through the base member 42. As the seat pan assembly 142 is moved from a rest position A to a deployed position B, the primary and secondary linkage arms 220a, 220b rotate in a clockwise direction about the first and second axes 162, 166. When the secondary linkage arms 220b move from the rest position A to the deployed position B, the secondary linkage arms 220b push the rear portion 142b of the seat pan assembly 142 forward and pull the rear portion 142b of the seat pan assembly 142 downward. When the secondary linkage arms 220b move from the rest position A to the deployed position B, the primary linkage arms 220a push the front portion 142a of the seat pan assembly 142 forward and push the front portion 142a of the seat pan assembly 142 upward. In the rest position A, a front portion 142a of the seat pan assembly 142 may have a height $H_1$. In the deployed position B, a front portion 142a of the seat pan assembly 142 may have a height $H_2$. The front portion 142a of the seat pan assembly 142 may also be referred to as the primary portion of the seat pan assembly 142. The rear portion 142b of the seat pan assembly 142 may also be referred to as the secondary portion of the seat pan assembly 142.

With continued reference to FIG. 8, the rotation assembly 170 is shown disposed at the rear portion 60b of the seat 60. The flange 190 of the second bracket 154 includes a cut-away portion 194 for limiting movement of the second bracket 154 between the rest position A and the deployed position B.

Figure 9:
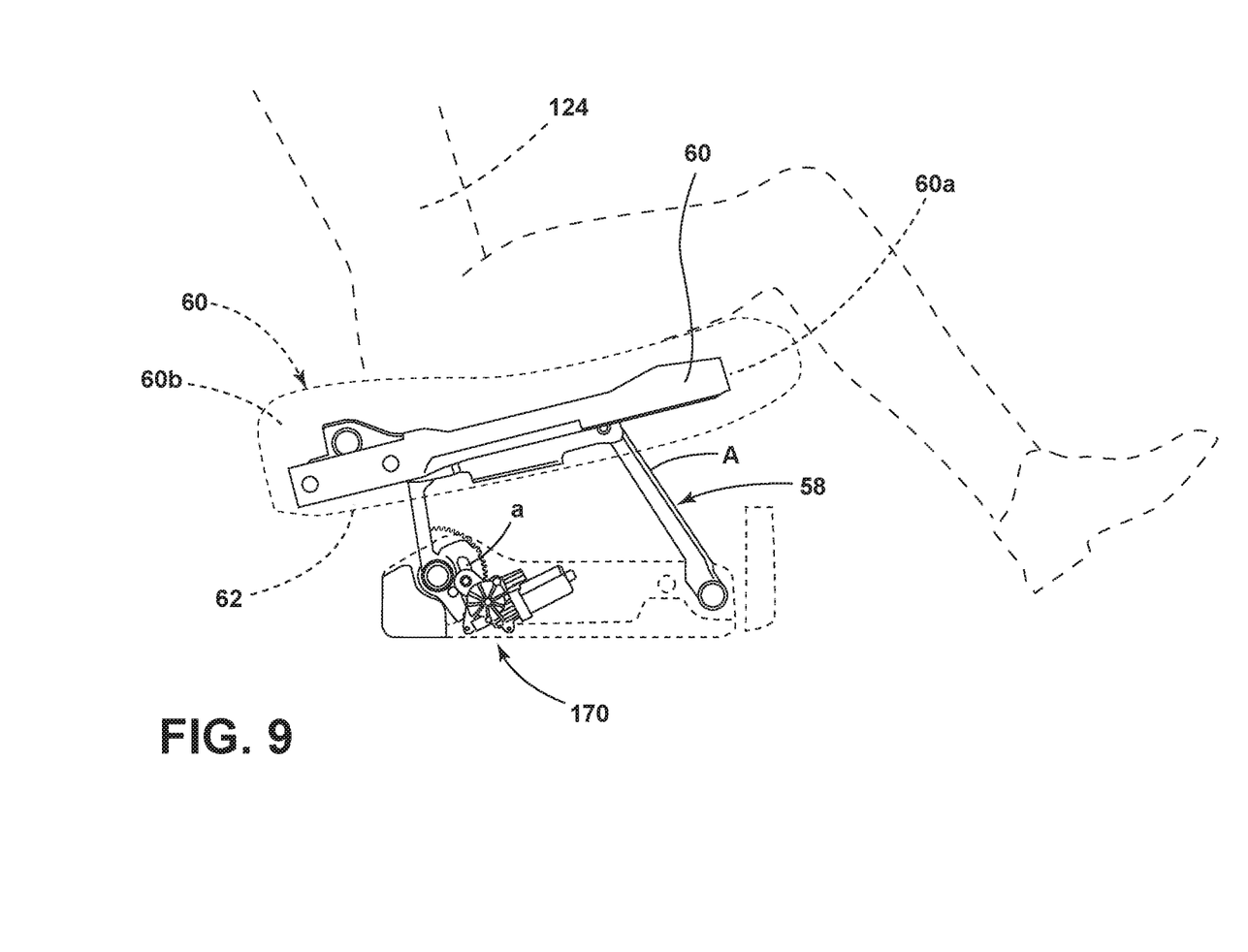
FIG. 9 is a cross-sectional view taken along line IX-IX of FIG. 5 of a second side of a seat including a seat pan, a linkage assembly, and a base member in a rest position, according to an example.
Figure 10:
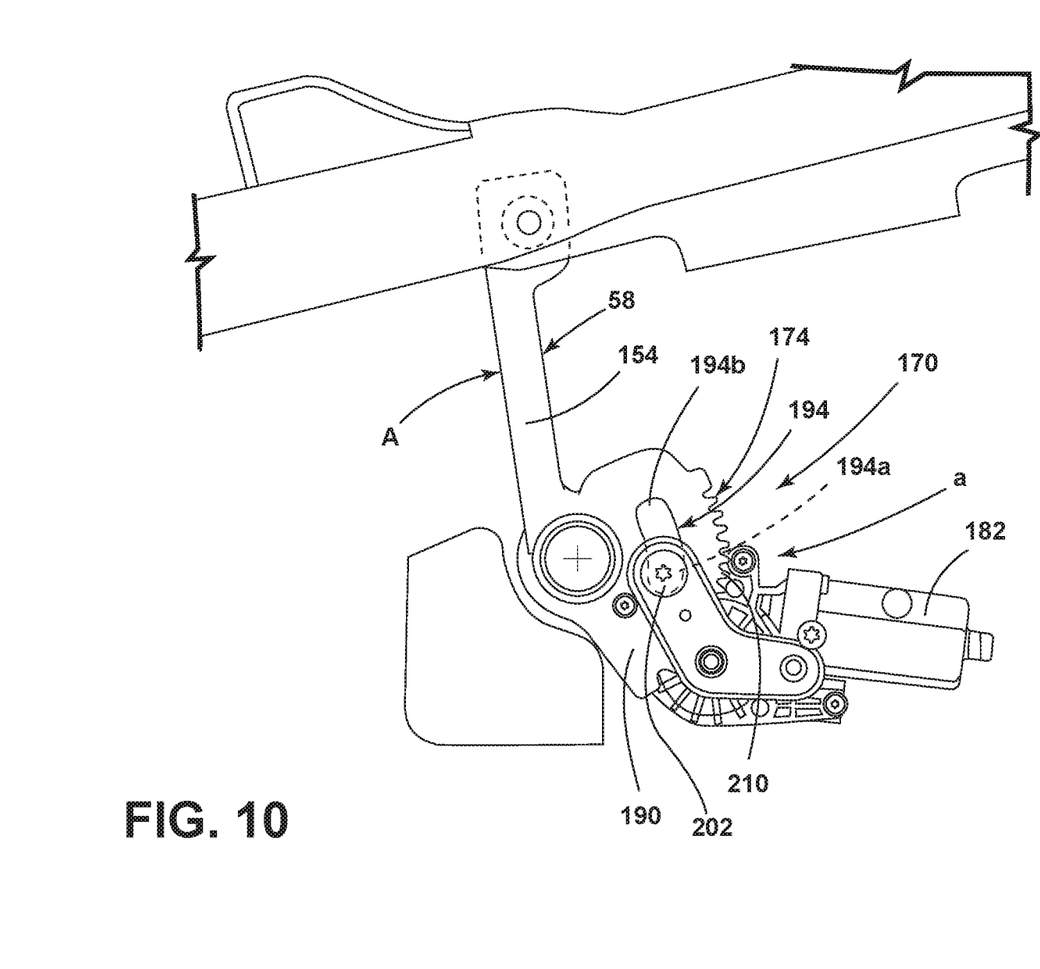
FIG. 10 is a cross-sectional view of a portion of the seat pan and linkage assembly shown in FIG. 8, according to an example.

Referring to FIGS. 9 and 10, the linkage assembly 58 is shown in the rest position A. Referring to FIG. 10, an exploded view of the rotation assembly 170 of FIG. 9 is shown. Referring to FIG. 10, the flange 190 of the second bracket 154 is shown in a first position a. The first position of the flange 190 of the second bracket 154 corresponds to the rest position A of the linkage assembly 58. The first position a of the flange 190 of the second bracket 154 may be defined by the stop bolt 202 being at the first end 194a of the cut-away portion 194 of the flange 190.

Figure 11:
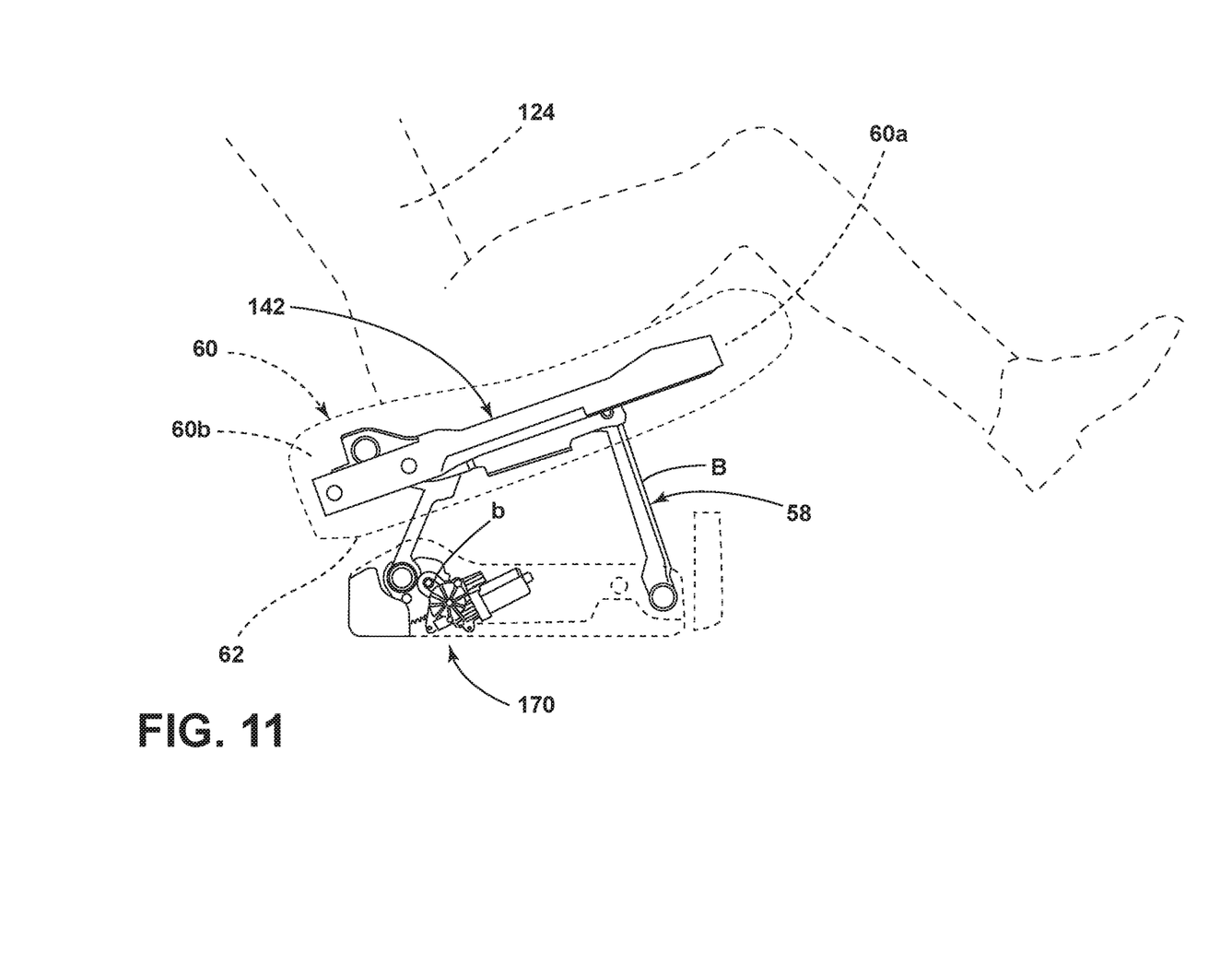
FIG. 11 is a cross-sectional view taken along line XI-XI of FIG. 5 of a second side of a seat including a seat pan, a linkage assembly, and a base member in a deployed position, according to an example.
Figure 12:
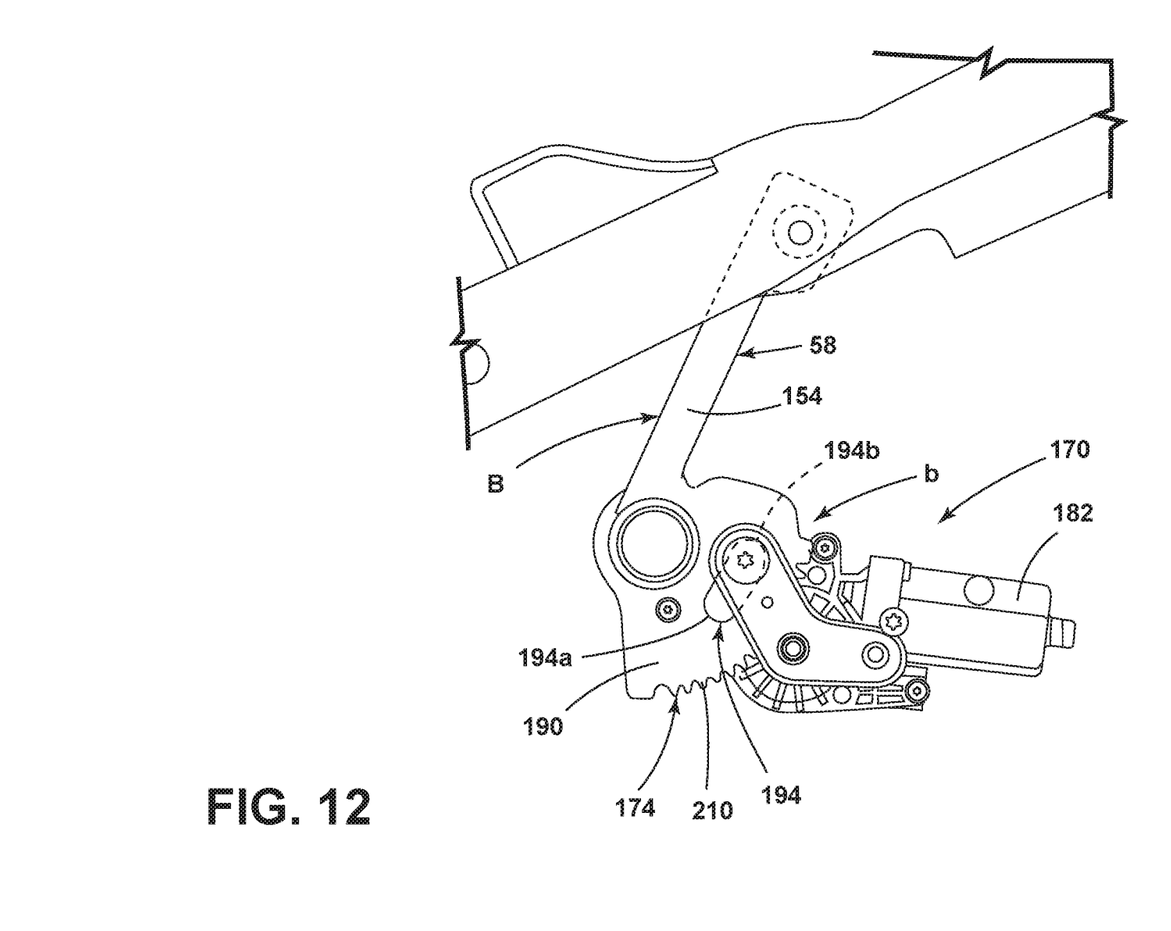
FIG. 12 is a cross-sectional view of a portion of the seat pan and linkage assembly shown in FIG. 10, according to an example.

Referring to FIGS. 11 and 12, the linkage assembly 58 is shown in the deployed position B. Referring to FIG. 12, an exploded view of the rotation assembly 170 of FIG. 11 is shown. The flange 190 of the second bracket 154 is shown in the second position b. The second position b of the flange 190 of the second bracket 154 corresponds to the deployed position B of the linkage assembly 58. The second position b of the flange 190 of the second bracket 154 may be defined by the stop bolt 202 being in the second end 194b of the cut-away portion 194 of the flange 190.

The rotation assembly 170 may be designed to allow for the desired height (for example, $H_1$ and $H_2$), incline angle (for example, $\alpha_1$ and $\alpha_2$), and positions (for example, stored position A, intermediary deployed positions $A_1$, $A_2$, $A_3$, and deployed position B). The primary linkage arms 220a and the secondary linkage arms 220b may be designed with lengths that allow for the desired height (for example, $H_1$ and $H_2$), incline angle (for example, $\alpha_1$ and $\alpha_2$), and positions (for example, stored position A, intermediary deployed positions $A_1$, $A_2$, $A_3$, and deployed position B) of the seating assembly 10. The attachment points (pivot points 158) of the primary linkage arms 200a and the secondary linkage arms 220b to the base member 42 and the seat pan assembly 142 may be designed for a desired height (for example, $H_1$ and $H_2$), incline angle (for example, $\alpha_1$ and $\alpha_2$), and positions (for example, stored position A, intermediary deployed positions $A_1$, $A_2$, $A_3$, and deployed position B) of the seating assembly 10. Also, the cut-away portion 194 of the second bracket 154, the teeth 210 disposed on the second bracket 154, and the teeth 210 disposed on the wheel 178 may be design factors relevant to the desired height (for example, $H_1$ and $H_2$), incline angle (for example, $\alpha_1$ and $\alpha_2$), and positions (for example, stored position A, intermediary deployed positions $A_1$, $A_2$, $A_3$, and deployed position B) of the seating assembly 10.

A variety of advantages may be derived from use of the present disclosure. A passenger 124 may position in a seat 60 in a rest position A, a deployed position B, and a plurality of intermediary positions ($A_1$, $A_2$, $A_3$) between the rest position A and the deployed position. A passenger 124 may adjust the seat 60 between the rest and the deployed position A, B to achieve the position that provides optimum comfort for the passenger 124. The seat 60 may be moved from a rest position A to a deployed position B to decrease the stress on the thigh and gluteal muscles of a seated passenger 124. The various positions of the seat 60 allow a passenger 124 to assume a posture that may be most comfortable for the passenger 124. When the seat 60 is in the deployed position B or an intermediary deployed position (for example, $A_3$) close to the deployed position B, then the seat 60 may provide anti-submarining load bearing and support during a dynamic event such as a collision that directs an impact force $F_1$ or a sudden deceleration force $F_1$ into the front of a seated passenger 124. A rotation assembly 170 may be efficiently located proximate a secondary linkage arm 220b of the linkage assembly 58. The rotation assembly 170 located proximate a secondary linkage arms 220b of the linkage assembly 58 may drive the primary linkage arms 220a forward.

It is to be understood that variations and modifications can be made on the afore-mentioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a seat including a seat pan assembly; and
   a linkage assembly including:
      a pair of primary linkage arms disposed in a U-shaped first bracket and pivotably coupled to the seat pan assembly;
      a pair of secondary linkage arms disposed in a rectangular-shaped second bracket and pivotably coupled to the seat pan assembly; and
      a base member pivotably coupled with each of the four linkage arms of the pair of primary linkage arms disposed in the U-shaped first bracket and the pair of secondary linkage arms disposed in the rectangular-shaped second bracket, wherein the U-shaped first bracket and the rectangular-shaped second bracket are disposed between the seat pan assembly and the base member and positionable between a rest position and a deployed position, wherein in the rest position, a first angle is formed between the seat pan assembly and a bottom of the base member, wherein in the deployed position, a second angle is formed between the seat pan assembly and the bottom of the base member, wherein the second angle is greater than the first angle, and wherein the U-shaped first bracket and the rectangular-shaped second bracket each extend between a first lateral seat pan member and a second lateral seat pan member.

2. The vehicle seating assembly of claim 1, wherein the U-shaped first bracket is pivotably coupled to a primary portion of the seat pan assembly, and wherein the rectangular-shaped second bracket is pivotably coupled to a secondary portion of the seat pan assembly.

3. The vehicle seating assembly of claim 2, wherein the primary portion of the seat pan assembly includes a front portion of the seat pan assembly.

4. The vehicle seating assembly of claim 3, wherein the secondary portion of the seat pan assembly includes a rear portion of the seat pan assembly.

5. The vehicle seating assembly of claim 1, wherein the seat pan assembly includes first and second lateral seat pan members and wherein each of the first and second lateral seat pan members are pivotably coupled to the U-shaped first bracket and the rectangular-shaped second bracket.

6. The vehicle seating assembly of claim 5, wherein the U-shaped first bracket is pivotably coupled to the base member, and wherein the U-shaped first bracket rotates about a first axis that extends through the base member between a rest position and a deployed position.

7. The vehicle seating assembly of claim 6, wherein the rectangular-shaped second bracket is pivotably coupled to the base member and wherein the rectangular-shaped second bracket rotates about a second axis that extends through the base member between a rest position and a deployed position.

8. The vehicle seating assembly of claim 7, further comprising:
   an actuator for engaging the rectangular-shaped second bracket, wherein the actuator exerts a force on the rectangular-shaped second bracket about the second axis to move the linkage assembly between the rest position and the deployed position.

9. The vehicle seating assembly of claim 8, wherein the actuator includes a rotary mechanism for rotating the rectangular-shaped second bracket about the second axis to move the linkage assembly between the rest position and the deployed position.

10. The vehicle seating assembly of claim 9, further comprising:
    a toothed interface between the rotary mechanism and the rectangular-shaped second bracket.

11. The vehicle seating assembly of claim 10, wherein the toothed interface includes a plurality of teeth disposed on the rectangular-shaped second bracket and a plurality of teeth disposed on a wheel coupled to the rotary mechanism and wherein the rotary mechanism is selectively activable to position the linkage assembly in a plurality of intermittent positions that correspond to the plurality of teeth disposed on the rectangular-shaped second bracket.

12. A vehicle seating assembly comprising:
    a seat including a seat bottom having a seat pan assembly;
    a pair of primary linkage arms disposed in a U-shaped first bracket and pivotably coupled to the seat pan assembly;
    a pair of secondary linkage arms disposed in a rectangular-shaped second bracket and pivotably coupled to the seat pan assembly;
    a base member pivotably coupled with each of the four linkage arms of the pair of primary linkage arms disposed in the U-shaped first bracket and the pair of secondary linkage arms disposed in the rectangular-shaped second bracket; and
    a rotary mechanism coupled to the rectangular-shaped second bracket and the base member, wherein the rotary mechanism is activable to move the seat bottom from a rest position to a deployed position, and wherein the rotary mechanism is activable to position the seat bottom in a plurality of intermittent positions between the rest position and the deployed position, wherein in the rest position, a front portion of the seat bottom has a first height, wherein in the deployed position, the front portion of the seat bottom has a second height, and wherein the second height is greater than the first height.

13. The vehicle seating assembly of claim 12, further comprising:
    a toothed flange coupled to at least one of the U shaped first bracket and the rectangular-shaped second bracket; and
    a toothed wheel coupled to the rotary mechanism, wherein the toothed flange and the toothed wheel form a toothed interface, and wherein the rotary mechanism rotates the toothed wheel to cause the toothed flange to move the seat bottom from the rest position to the deployed position and to selectively position the toothed flange in a plurality of intermittent positions between the rest position and the deployed position.

14. The vehicle seating assembly of claim 13, further comprising:
    a stop bracket secured to the rotary mechanism, and
    a stop bolt extending from the stop bracket and through a cut-away portion of the toothed flange, wherein the stop bolt extends through the cut-away portion of the toothed flange as the toothed flange rotates to move the seat bottom between the rest position and the deployed position.

15. The vehicle seating assembly of claim 14, wherein in the rest position, the stop bolt is disposed in a first end of the cut-away portion of the toothed flange and wherein in the deployed position, the stop bolt is disposed in a second end of the cut-away portion of the toothed flange.

16. The vehicle seating assembly of claim 15, wherein the toothed flange and the rectangular-shaped second bracket are integral parts.

17. A vehicle seating assembly comprising:
- a seat pan assembly;
- a pair of primary linkage arms disposed in a U-shaped first bracket and pivotably coupled to the seat pan assembly;
- a pair of secondary linkage arms disposed in a rectangular-shaped second bracket and pivotably coupled to the seat pan assembly;
- a base member pivotably coupled with each of the pair of primary linkage arms disposed in the U-shaped first bracket and each of the pair of secondary linkage arms disposed in the rectangular-shaped second bracket;
- a gear rack coupled with one of the pair of primary linkage arms or one of the pair of secondary linkage arms and defining an articulation path therefor; and
- a pinion operably engaged with the gear rack to drive articulation of the one of the pair of primary linkage arms disposed in the U-shaped first bracket or one of the pair of secondary linkage arms disposed in the rectangular-shaped second bracket and movement of the seat pan assembly between a rest position and a deployed position.

* * * * *